US012321702B2

(12) United States Patent
Mohan et al.

(10) Patent No.: US 12,321,702 B2
(45) Date of Patent: Jun. 3, 2025

(54) AUTOMATICALLY AUGMENTING AND LABELING CONVERSATIONAL DATA FOR TRAINING MACHINE LEARNING MODELS

(71) Applicant: Walmart Apollo, LLC, Bentonville, AR (US)

(72) Inventors: Deepa Mohan, Los Altos, CA (US); Komal Arvind Dhuri, San Jose, CA (US); Simral Chaudhary, Sunnyvale, CA (US); Jorge Adrian Sanchez Castro, Long Island City, NY (US)

(73) Assignee: WALMART APOLLO, LLC, Bentonville, AR (US)

(*) Notice: Subject to any disclaimer, the term of this patent is extended or adjusted under 35 U.S.C. 154(b) by 536 days.

(21) Appl. No.: 17/589,860

(22) Filed: Jan. 31, 2022

(65) Prior Publication Data
US 2023/0244871 A1    Aug. 3, 2023

(51) Int. Cl.
*G10L 15/06* (2013.01)
*G06F 18/2431* (2023.01)
(Continued)

(52) U.S. Cl.
CPC ........ *G06F 40/289* (2020.01); *G06F 18/2431* (2023.01); *G06F 40/284* (2020.01); *G06N 20/00* (2019.01); *G10L 15/063* (2013.01)

(58) Field of Classification Search
CPC ............................. G10L 15/063; G06F 40/284
See application file for complete search history.

(56) References Cited

U.S. PATENT DOCUMENTS

2008/0033714 A1*   2/2008   Gupta ................... G06F 40/284
                                                                      704/9
2013/0138641 A1    5/2013   Korolev et al.
(Continued)

OTHER PUBLICATIONS

Palivela, "Optimization of paraphrase generation and identification using language models in natural language processing," IJIMDI, 2021. (Year: 2021).*

(Continued)

*Primary Examiner* — Feng-Tzer Tzeng
(74) *Attorney, Agent, or Firm* — BRYAN CAVE LEIGHTON PAISNER LLP (57) ABSTRACT

A method implemented via execution of computing instructions configured to run at one or more processors and stored at one or more non-transitory computer-readable media. The method can include generating training data for an intent classification machine learning model by: (a) determining, via a text-to-text machine learning model, one or more respective paraphrases for each sample phrase of training phrases; (b) generating, via a label generating machine learning model, labeled data based on unlabeled live logs by: (i) determining live-log samples from the unlabeled live logs based at least in part on: a respective timestamp of each live log of the unlabeled live logs, or random sampling; and (ii) generating, via the label generating machine learning model, the labeled data based on the live-log samples and one or more labeling functions; and (c) adding the one or more respective paraphrases for the each sample phrase of the training phrases and the labeled data to the training data. In certain embodiments, a respective quantity of the one or more respective paraphrases can vary for the each sample phrase of the training phrases. In some embodiments, the method further can include transmitting the training data, as generated, to the intent classification machine learning model for training. Other embodiments are described.

20 Claims, 4 Drawing Sheets

(51) Int. Cl.
 *G06F 40/289* (2020.01)
 *G06F 40/284* (2020.01)
 *G06N 20/00* (2019.01)

(56) References Cited

U.S. PATENT DOCUMENTS

2017/0206465 A1* 7/2017 Jin ..................... G06F 16/5866
2019/0237061 A1* 8/2019 Rusak ................... G06F 40/216
2021/0034812 A1   2/2021 Mezaoui et al.
2021/0216544 A1   7/2021 Hill et al.
2021/0390951 A1   12/2021 Gadde et al.

OTHER PUBLICATIONS

Palivela, H., "Optimization of Paraphrase Generation and Identification Using Language Models in Natural Language Processing," Int'l Journal of Information Management Data Insights 1, published by Elsevier Ltd. at https://doi.org/10.1016/j.jimei.2021.100025 (9 pgs) Jun. 28, 2021.
Karamanolakis, G., et al., "Self-Training with Weak Supervision," arXiv:2104.05514v1 [cs.CL] Apr. 12, 2021 (19 pgs) Apr. 12, 2021.

* cited by examiner

410 Generating training data for an intent classification machine learning model

411 Determining, via a text-to-text machine learning model, one or more respective paraphrases for each sample phrase of the training phrases

412 Generating one or more new phrases based on an input phrase and one or more entity maps

413 Generating, via a label generating machine learning model, labeled data based on unlabeled live log

414 Adding the one or more respective paraphrases for the each sample phrase of the training phrases, the one or more new phrases, and the labeled data to the training data

420 Transmitting the training data, as generated, to the intent classification machine learning model for training

FIG. 4

AUTOMATICALLY AUGMENTING AND LABELING CONVERSATIONAL DATA FOR TRAINING MACHINE LEARNING MODELS

TECHNICAL FIELD

This disclosure relates generally to automatically augmenting and labeling conversational data for training machine learning models.

BACKGROUND

Machine learning models are popular in various applications because they not only can performed various functions but also can dynamically improve their functionalities. The quality of the performance of a machine learning model relies on how well the model is trained, and the quality and quantity of a dataset for training the machine learning model can significantly affect the quality of the training. Existing commercial datasets are either non-domain specific or outdated. Therefore, systems and/or methods that can automatically and dynamically augment and label training data based on limited pre-labeled data are desired.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately 0.1 second, 0.5 second, one second, two seconds, five seconds, or ten seconds.

DESCRIPTION OF EXAMPLES OF EMBODIMENTS

Figure 1:
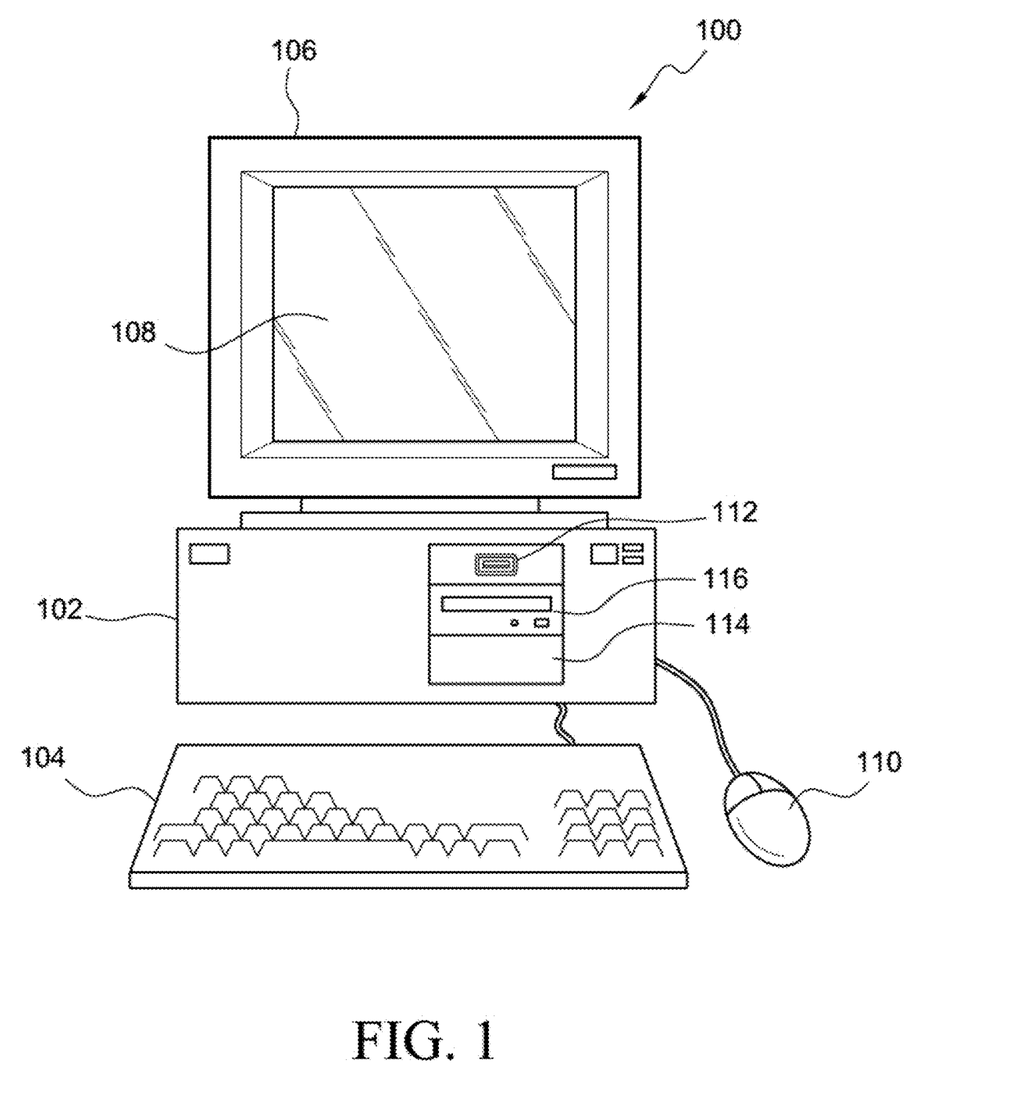
FIG. 1 illustrates a front elevation view of a computer system that is suitable for implementing an embodiment of the system disclosed in FIG. 3.
Figure 2:
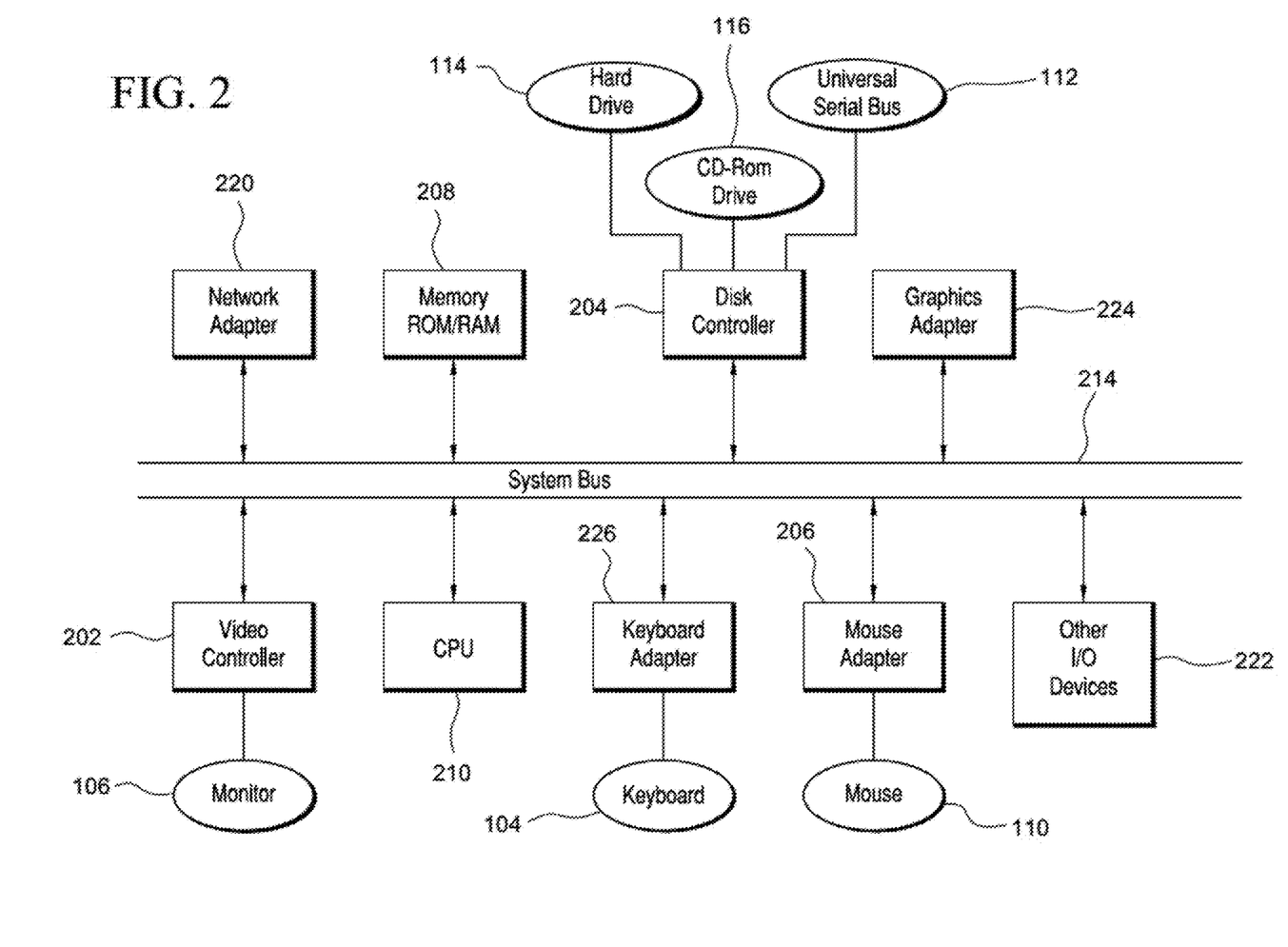
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. (Microsoft) of Redmond, Washington, United States of America, (ii) Mac® OS X by Apple Inc. (Apple) of Cupertino, California, United States of America, (iii) UNIX® OS, and (iv) Linux® OS. Further exemplary operating systems can comprise one of the following: (i) the iOS® operating system by Apple, (ii) the Blackberry® operating system by Research In Motion (RIM) of Waterloo, Ontario, Canada, (iii) the WebOS operating system by LG Electronics (LG) of Seoul, South Korea, (iv) the Android™ operating system developed by Google, Inc. (Google) of Mountain View, California, United States of America, or (v) the Windows Mobile™ operating system by Microsoft.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
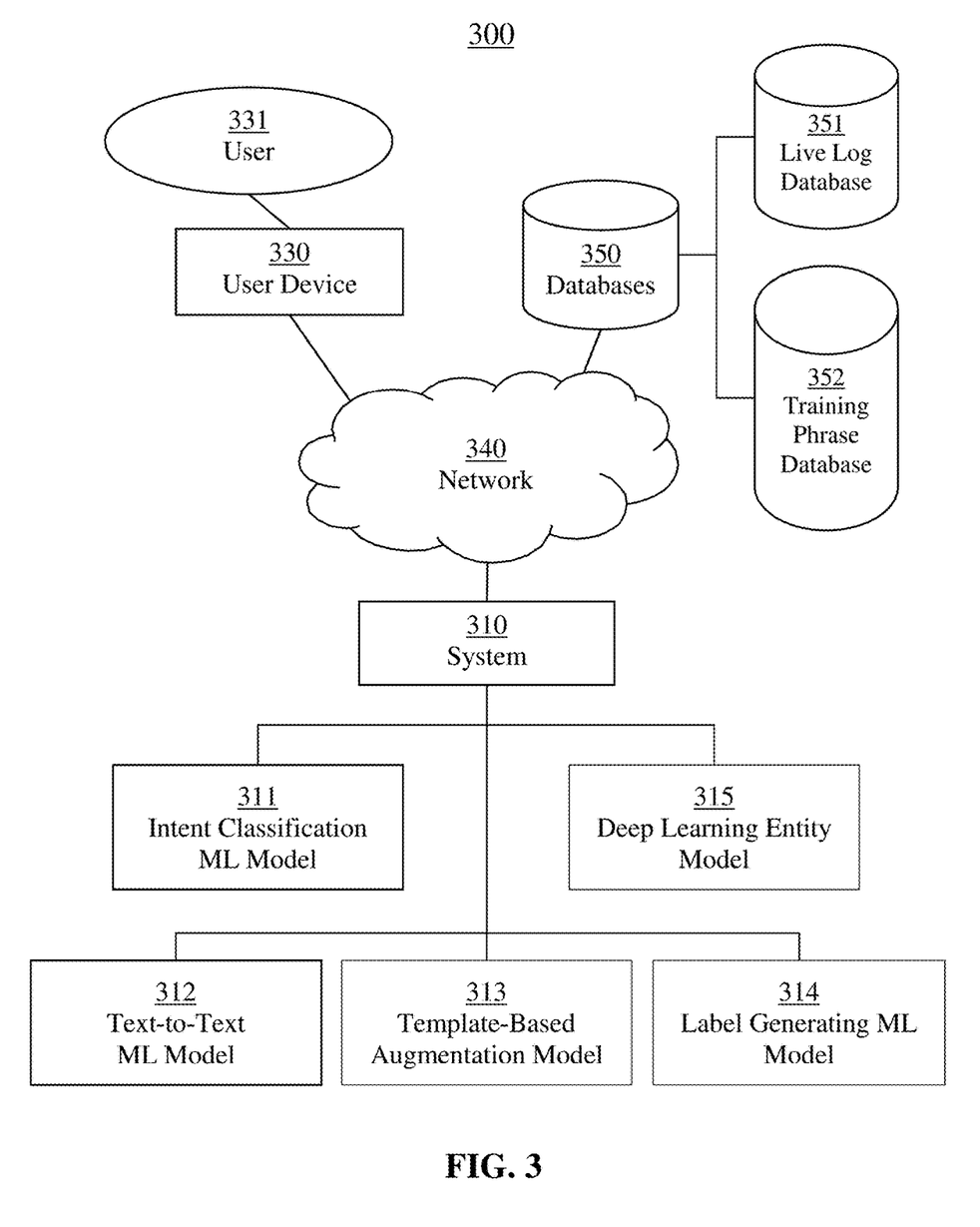
FIG. 3 illustrates a block diagram of a system that can be employed for automatically augmenting and labeling conversational data for training machine learning models, according to an embodiment.

Turning ahead in the drawings, FIG. 3 illustrates a block diagram of a system 300 that can be employed for automatically augmenting and labeling conversional data for training machine learning models, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include one or more systems (e.g., system 310) and one or more user devices (e.g., user device 330) for various users (e.g., user 331). System 310 and/or user device 330 can each be a computer system, such as computer system 100 (FIG. 1), as described above, and can each be a single computer, a single server, or a cluster or collection of computers or servers, or a cloud of computers or servers. In another embodiment, a single computer system can host each of system 310 and/or user device 330. In many embodiments, system 310 can be modules of computing instructions (e.g., software modules) stored at non-transitory computer readable media that operate on one or more processors. In other embodiments, system 310 can be implemented in hardware. In many embodiments, system 310 can comprise one or more systems, subsystems, servers, modules, or models, including machine learning (ML) models. Examples of the models of system 310 can include intent classification ML model 311, text-to-text ML model 312, template-based augmentation model 313, label-generating ML model 314, and/or deep learning entity model 315. Additional details regarding system 310, intent classification ML model 311, text-to-text ML model 312, template-based augmentation model 313, label-generating ML model 314, deep learning entity model 315, and/or user device 330 are described below.

In some embodiments, system 310 can be in data communication, through a network 340 (e.g., a computer network, a telephone network, and/or the Internet), with user device 330 and/or other computer systems, such as a front-end e-commerce website. In some embodiments, user device 330 can be used by users (e.g., user 331). In a number of embodiments, the front-end e-commerce website can allow users (e.g., user 331) to browse, search, and/or purchase items (e.g., products or produces offered for sale by a retailer), and/or chat with customer service agents, in addition to other suitable activities.

In some embodiments, an internal network (e.g., network 340) that is not open to the public can be used for communications between system 310 and/or user device 330. In these or other embodiments, the operator and/or administrator of system 310 can manage system 310, the processor(s) of system 310, and/or the memory storage unit(s) of system 310 using the input device(s) and/or display device(s) of system 310.

In certain embodiments, the user devices (e.g., user device 330) can be desktop computers, laptop computers, mobile devices, and/or other endpoint devices used by one or more users (e.g., user 331). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, system 310 can include one or more input devices (e.g., one or more keyboards, one or more keypads, one or more pointing devices such as a computer mouse or computer mice, one or more touchscreen displays, a microphone, etc.), and/or can comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 310. In a similar manner, the processors and/or the non-transitory computer-readable media can be local and/or remote to each other.

Meanwhile, in many embodiments, system 310 also can be configured to communicate with one or more databases (e.g., databases 350, live log database 351, and/or training phrase database 352). Databases 350 can include live log database 351 that includes unlabeled conversational data that can be collected from various sources, such as online chats and/or transcripts of phone or video calls at a customer service center. Databases 350 further can include training phrase database 352 that can comprise labeled training phrases provided by users (e.g., user 331) and/or a pre-trained machine learning model (e.g., intent classification ML model 311).

In some embodiments, for any particular database of the one or more databases (e.g., databases 350, live log database 351, and/or training phrase database 352), that particular database can be stored on a single memory storage unit or the contents of that particular database can be spread across multiple ones of the memory storage units storing the one or more databases, depending on the size of the particular database and/or the storage capacity of the memory storage units. Further, the one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, system 300, system 310, and/or databases 350 can be implemented using any suitable manner of wired and/or wireless communication. Accordingly, system 300 and/or system 310 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, system 310 can generate training data for intent classification ML model 311. Then, system 310 can transmit the training data, as generated, to intent classification ML model 311 for training. In a number of embodiments, system 310 can generate training data by determining, via text-to-text ML model 312, one or more respective paraphrases for each sample phrase of training phrases and then add the one or more respective paraphrases to the training data.

In some embodiments, a respective quantity of the one or more respective paraphrases can vary for the each sample phrase of the training phrases. For example, system 310 can have a range (e.g., 1-3, 3-8, 5-10, etc.) of the respective quantity of the one or more respective paraphrases for the each sample phrase. In a number of embodiments, system 310 can determine the range of the respective quantity of the one or more respective paraphrases for the each sample phrase based on a predetermined minimum accumulative paraphrase probability and/or a predetermined maximum quantity (e.g., the top-k and/or top-p sampling techniques). In some embodiments, after determining the one or more respective paraphrases for the each sample phrase, system 310 can sort the one or more respective paraphrases for the each sample phrase in descending order based on a respective paraphrase probability of each of the one or more respective paraphrases in a paraphrase probability distribution of the each sample phrase. System 310 further can determining a minimum quantity of the one or more respective paraphrases, as sorted, so that an accumulative paraphrase probability for the minimum quantity of the one or more respective paraphrases, as sorted, is at least as great as a predetermined probability (e.g., the predetermined minimum accumulative paraphrase probability as provided above, 85%, 90%, 95%, etc.). For instance, in an embodiment where the predetermined probability is 90%, after system 310 determines 7 respective paraphrases for an exemplary sample phrase, system 310 can sort the 7 respective paraphrases based on the respective paraphrase probability. If the respective paraphrase probability of the 7 respective paraphrases is 50%, 30%, 8%, 6%, 3%, 2%, and 1% respectively, system 310 can determine that the minimum quantity of the 7 respective paraphrases for the exemplary sample phrase is 4 when the accumulative paraphrase probability of the first 4 paraphrases is 94%, which is at least as great as the predetermined probability 90%.

In a number of embodiments, when the minimum quantity determined by system 310 is greater than a predetermined maximum paraphrase quantity, system 310 also can set the minimum quantity as the predetermined maximum paraphrase quantity. In certain embodiments, system 310 additionally can remove each paraphrase in a position of the one or more respective paraphrases, as sorted, greater than the minimum quantity from the one or more respective paraphrases. Referring back to the example above, if system 310 has a predetermined maximum paraphrase quantity, which is 3, then the minimum quantity of the 7 respective paraphrases for the exemplary sample phrase can be set from 4 to 3, and system 310 can remove the $4^{th}$ to $7^{th}$ paraphrases so that the 7 respective paraphrases, as sorted, become the 3 respective paraphrases for the exemplary sample phrase.

In some embodiments, to determine the one or more respective paraphrases for the each sample phrase of the training phrases, system 310 further can determine whether a paraphrase of the one or more respective paraphrases for the each sample phrase is unacceptable. In several embodiments, system 310 can determine that the paraphrase of the one or more respective paraphrases for the each sample phrase is unacceptable when one or more of: (a) a difference between a sequence length of the paraphrase and a sequence length of the each sample phrase is greater than a predetermined sequence length threshold (e.g., 3, 5, 8, etc.); (b) a linguistic acceptability score of the paraphrase is less than a predetermined linguistic threshold; or (c) a semantic similarity score between the paraphrase and the each sample phrase is less than a predetermined similarity threshold. In certain embodiments, system 310 can be configured to allow minor grammatical errors in the each sample phrase when determining the linguistic acceptability score of the paraphrase. The degree of tolerance for grammatical errors can vary depending on the domain. For example, the degree of tolerance can be higher in the retail business, compared to the higher education industry. Moreover, when the paraphrase, as determined, is unacceptable, system 310 can remove the paraphrase from the one or more respective paraphrases.

In many embodiments, prior to determining the one or more respective paraphrases for the each sample phrase of the training phrases, text-to-text ML model 312 can be pre-trained, by system 300, system 310, or a separate system, based on a first dataset with unlabeled data (e.g., data in live log database 351 or the Colossal Clean Crawled Corpus (C4) dataset) and fine-tuned based on a second dataset with paraphrase pairing data (e.g., data in training phrase database 352 or the Paraphrase Adversaries from Word Scrambling (PAWS) dataset). Text-to-text ML model 312 can include any suitable natural language processing (NLP) artificial intelligence (AI) and/or ML algorithms, such as Text To Text Transfer Transformer (T5).

In some embodiments, prior to determining the one or more respective paraphrases for the each sample phrase, system 310 further can include, when the each sample phrase comprises one or more domain-specific acronyms (e.g., PLU (price look-up code), OSCA (on shelf customer availability), etc.), abstracting out the one or more domain-specific acronyms in the each sample phrase so that the one or more domain-specific acronyms are not paraphrased.

Still referring to FIG. 3, in many embodiments, system 310 additionally can generate, via label generating ML model 314, labeled data for the intent classification machine learning model based on unlabeled live logs (e.g., data in live log database 351) and add the labeled data to the training dataset for intent classification ML model 311. In some embodiments, system 310 can generate the labeled data by determining live-log samples from the unlabeled live logs based at least in part on: (a) a respective timestamp of each live log of the unlabeled live logs, or (b) random sampling. For example, system 310 can determine the live-log samples from the unlabeled live logs by: (a) stratifying the unlabeled live logs into multiple data bins based on the respective timestamp of each live log of the unlabeled live logs (e.g., assigning an unlabeled live log to a data bin with the other unlabeled live log(s) when their respective timestamps are in the same day, week, or month, etc.); and (b) randomly determining respective bin live logs from each of the multiple data bins to add to the live-log samples. A respective quantity of the respective bin live logs for the each of the multiple data bins can be: (i) a predetermined number; or (ii) proportional to a respective bin size of the each of the multiple data bins. In another example, system 310 can use BigQuery-based TABLESAMPLE and RANDom Sampling functions on the unlabeled live logs to determine the live-log samples.

In a number of embodiments, system 310 can generate the labeled data further by generating, via label generating ML model 314, the labeled data based on the live-log samples and one or more labeling functions. Label generating ML model 314 can include any suitable AI and/or ML algorithms, such as Snorkel algorithms.

In some embodiments, the one or more labeling functions for generating the labeled data can include retrieving one or more respective labels for each of the live-log samples from an existing table (e.g., training phrase database 352) based on: one or more entities, or one or more regular expressions, in the each of the live-log samples. In a few embodiments, the existing table can be generated by any suitable approaches, such as unigram, bigram, and/or trigram formation algorithm for the Countvectorizer approach that runs periodically (e.g., daily or weekly) in pipeline on input data from live log database 351 or provided by users (e.g., user 331).

In a number of embodiments, the one or more labeling functions for generating the labeled data further can include determining the one or more respective labels for each of the live-log samples based on a respective distance (e.g., an embedding-based cosine distance) between a respective embedding of each of the one or more respective labels and each phrase of one or more phrases in the each of the live-log samples. The respective embedding of each of the one or more respective labels can be generated based on any suitable text embedding approaches, such as the Universal Sentence Encoder, the Transformer encode, etc.

In certain embodiments, the one or more labeling functions for generating the labeled data also can include determining, via deep learning entity model 315, the one or more respective labels for each of the live-log samples based on one or more entities (e.g., product names or brands in a catalogue, etc.) in the each of the live-log samples. Deep learning entity model 315 can include any suitable AI and/or ML algorithms, such as Bidirectional Encoder Representations from Transformers (BERT), or other transformer-based ML algorithms.

In some embodiments, after one or more labels of the labeled data are determined based the on one or more labeling functions, system 310 further can apply strict filtering and remove one or more phrases of the live-log samples from the live-log samples for which the labeled data determined are dissimilar. In some embodiments, system 310 can determine a distance (e.g., an embedding-based cosine distance) between a labeled phrase of the labeled data and an intent embedding for a label tagged by label generating ML model 314 for the labeled phrase. System 310 further can remove the labeled phrase from the labeled data when the distance is greater than a predetermined label distance threshold (e.g., a predetermined number or a mean threshold).

In a number of embodiments, system 310 additionally can generate the training data for intent classification ML model 311 by generating one or more new phrases based on an input phrase and one or more entity maps and add the one or more new phrases to the training dataset for intent classification ML model 311. In many embodiments, system 310 can generate the one or more new phrases based on the input phrase and the one or more entity maps by any suitable algorithms or models, such as template-based augmentation model 313. In some embodiments, system 310 can generate the one or more new phrases by: (a) mapping the input phrase with a corresponding entity map of the one or more entity maps to identify one or more entities in the input phrase; and (b) replacing the one or more entities in the input phrase by one or more sets of one or more first entities of preexisting entities to generate the one or more new phrases.

For example, the one or more entity maps each can include one or more slots to be filled in and one or more entities, e.g., "_ _ _ queryitem" or "_ _ _ _ dept dept." When an input phrase is "which aisle is pot in," the corresponding entity map can be "_ _ _queryitem_", and the entity (e.g., queryitem) in the input phrase can be "pot." As such, a corresponding template can be determined to be "which aisle is queryitem in," and the new phrase(s) to be generated by replacing the entity by preexisting entities (e.g., toast or bike lock, etc.) in the input phrase can be "which aisle is toast in," "which aisle is bike lock in," etc. When an input phrase is "what are the sales in dept 92," the corresponding entity map can be "_ _ _ _ dept" and the entities (e.g., dept dept) in the input phrase can be "dept 92." The new phrase(s) to be generated by replacing the entities by preexisting entities (e.g., Produce or Pharmacy) in the input phrase can be "what are the sales in Produce," "what are the sales in Pharmacy," etc. In several embodiments, when a preexisting entity to replace one or more entities in the entity maps has a different length from the length of the one or more entities, a new entity map can be created. For example, in the prior example, when "bike lock" with 2 words is used to replace the single-word entity in "_ _ _ queryitem_", a new entity map, ""_ _ _ queryitem_" with a 2-word entity can be created.

Figure 4:
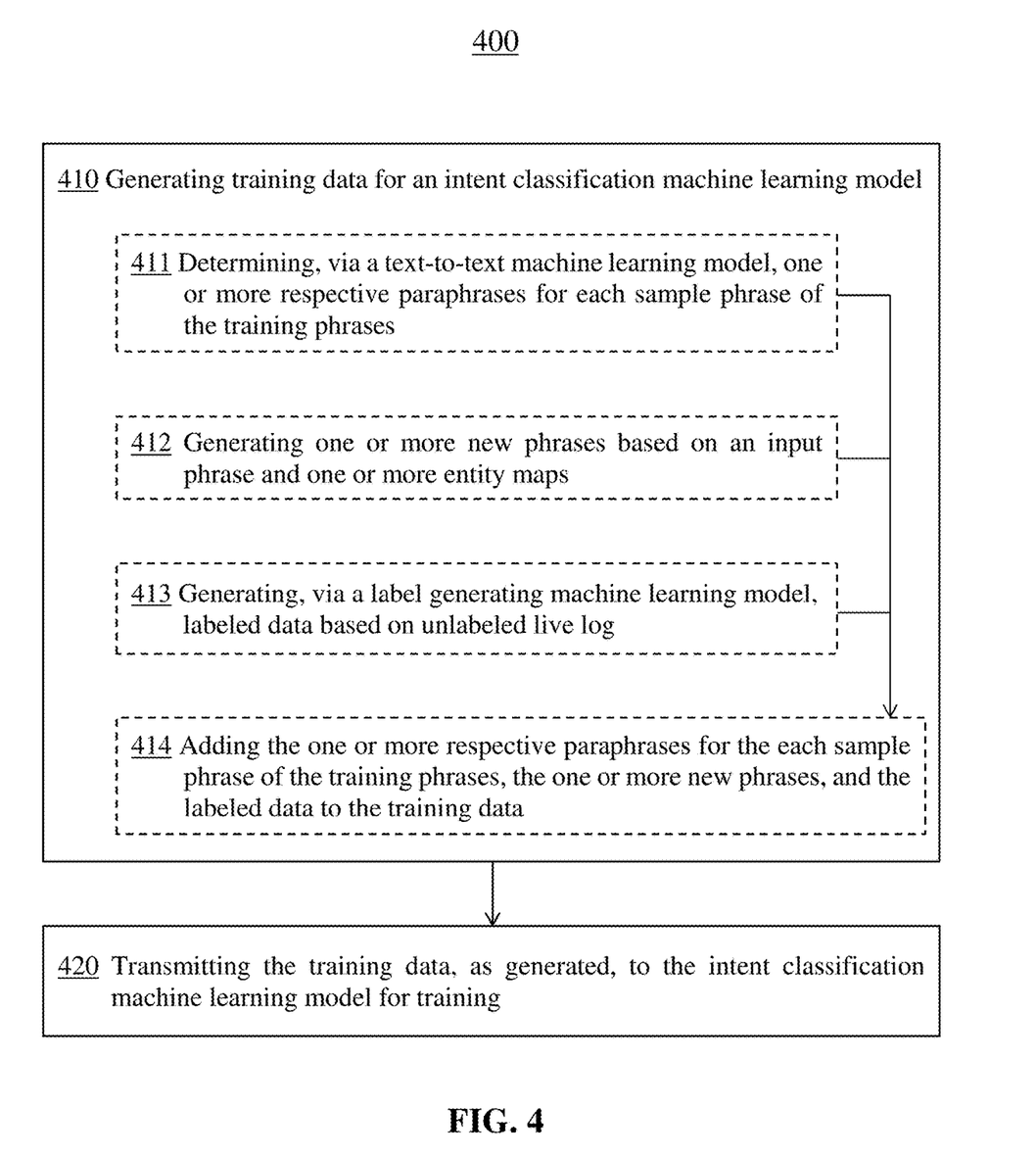
FIG. 4 illustrates a flow chart for a method for automatically augmenting and labeling conversational data, according to an embodiment.

Turning ahead in the drawings, FIG. 4 illustrates a flow chart for a method 400, according to an embodiment. In many embodiments, method 400 can be implemented via execution of computing instructions on one or more processors for automatically augmenting and labeling conversional data. Method 400 is merely exemplary and is not limited to the embodiments presented herein. Method 400 can be employed in many different embodiments or examples not specifically depicted or described herein. In some embodiments, the procedures, the processes, the activities, and/or the blocks of method 400 can be performed in the order presented. In other embodiments, the procedures, the processes, the activities, and/or the blocks of method 400 can be performed in any suitable order. In still other embodiments, one or more of the procedures, the processes, the activities, and/or the blocks of method 400 can be combined or skipped.

In many embodiments, system 300 (FIG. 3) and/or system 310 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as system 300 (FIG. 3) and/or system 310 (FIG. 3). The processor(s) can be similar or identical to the processor(s) described above with respect to computer system 100 (FIG. 1).

In many embodiments, method 400 can be performed by a computer server, such as system 300 (FIG. 3) and/or system 310 (FIG. 3), to generate training data for an intent classification machine learning model (e.g., intent classification ML model 311 (FIG. 3), a BERT-based intent recognition model, etc.) (block 410). In a number of embodiments, method 400 can include generating the training data by: (a) one or more of: (i) determining, via a text-to-text machine learning model, one or more respective paraphrases for each sample phrase of the training phrases (block 411); (ii) generating one or more new phrases based on an input phrase and one or more entity maps (block 412); and/or (iii) generating, via a label generating machine learning model, labeled data based on unlabeled live log (block 413); and (b) adding the one or more respective paraphrases for the each sample phrase of the training phrases, the one or more new phrases, and the labeled data to the training data (block 414). The sequence of blocks 411, 412, and 413 in FIG. 4 is merely exemplary, and blocks 411, 412, and 413 can be performed in any suitable order.

In a number of embodiments, method 400 additionally can include transmitting the training data, as generated, to the intent classification machine learning model for training (block 420). In certain embodiments, the intent classification machine learning model can be in data communication with, while being separate from, the text-to-text machine learning model in block 411, and/or the label generating machine learning model in block 412, and block 420 can transmit, via a network (e.g., network 340 (FIG. 3)), the training data to the intent classification machine learning model.

Still referring to FIG. 4, the text-to-text machine learning model (e.g., text-to-text ML model 312 (FIG. 3)) in block 411 can be pre-trained, by method 400 or other systems/methods, based on a first dataset with unlabeled data and fine-tuned based on a second dataset with paraphrase pairing data. Further, method 400 can include, prior to determining the one or more respective paraphrases for the each sample phrase of the training phrases in block 411, when the each sample phrase comprises one or more domain-specific acronyms, abstracting out the one or more domain-specific acronyms in the each sample phrase.

In some embodiments, determining, via the text-to-text machine learning model (e.g., text-to-text ML model 312 (FIG. 3)), the one or more respective paraphrases for the each sample phrase of the training phrases in block 411 can include sorting the one or more respective paraphrases for the each sample phrase in descending order based on a respective paraphrase probability of each of the one or more respective paraphrases in a paraphrase probability distribution of the each sample phrase. Block 411 further can include determining a minimum quantity of the one or more respective paraphrases, as sorted, so that an accumulative paraphrase probability for the minimum quantity of the one or more respective paraphrases, as sorted, is at least as great as a predetermined probability. In several embodiments, when the minimum quantity is greater than a predetermined maximum paraphrase quantity, block 411 can set the minimum quantity as the predetermined maximum paraphrase quantity. Block 411 also can include removing each paraphrase in a position of the one or more respective paraphrases, as sorted, greater than the minimum quantity from the one or more respective paraphrases.

In a number of embodiments, block 411 further can include determining whether a paraphrase of the one or more respective paraphrases for the each sample phrase is unacceptable; and when the paraphrase, as determined, is unacceptable, removing the paraphrase from the one or more respective paraphrases. Method 400 can determine whether the paraphrase is unacceptable by any suitable criteria. Examples of the criteria can include whether a difference between a sequence length of the paraphrase and a sequence length of the each sample phrase is greater than a predetermined sequence length threshold. The criteria also can include whether a linguistic acceptability score of the paraphrase (e.g., how linguistically correct the paraphrase is) is less than a predetermined linguistic threshold. The criteria further can include a semantic similarity score between the paraphrase and the each sample phrase (e.g., how semantically similar the paraphrase is to the each sample phrase) is less than a predetermined similarity threshold.

In several embodiments, generating the one or more new phrases based on the input phrase and the one or more entity maps in block 412 can include any suitable models (e.g., template-based augmentation model 313 (FIG. 3)). For example, block 412 can include mapping the input phrase with a corresponding entity map of the one or more entity maps to identify one or more entities in the input phrase; and replacing the one or more entities in the input phrase by one or more sets of one or more first entities of preexisting entities to generate the one or more new phrases.

In many embodiments, generating, via the label generating machine learning model (e.g., label generating ML model 314 (FIG. 3)), the labeled data based on the unlabeled live log in block 413 can include determining live-log samples from the unlabeled live logs based at least in part on: (a) a respective timestamp of each live log of the unlabeled live logs, or (b) random sampling; and generating, via the label generating machine learning model, the labeled data based on the live-log samples and one or more labeling functions. The one or more labeling functions for generating the labeled data can include retrieving one or more respective labels for each of the live-log samples from an existing table based on: (a) one or more entities, or (b) one or more regular expressions, in the each of the live-log samples; determining the one or more respective labels for each of the live-log samples based on a respective distance between a respective embedding of each of the one or more respective labels and each phrase of one or more phrases in the each of the live-log samples; or determining, via a deep learning entity model (e.g., deep learning entity model 315 (FIG. 3)), the one or more respective labels for each of the live-log samples based on one or more entities in the each of the live-log samples.

Moreover, block 413 further can include determining a distance between a labeled phrase of the labeled data and an intent embedding for a label tagged by the label generating machine learning model for the labeled phrase; and when the distance is greater than a predetermined label distance threshold, removing the labeled phrase from the labeled data.

In various embodiments, any machine learning models provided above for method 400 (e.g., text-to-text ML model 312 (FIG. 3), label-generating ML model 314 (FIG. 3), and/or deep learning entity model 315 (FIG. 3)) can be pre-trained, or re-trained, based on a corresponding training dataset. In some embodiments, a machine learning model used in method 400 can also consider both historical and dynamic input from the system performing method 400 (e.g., system 300 (FIG. 3) or 310 (FIG. 3)). In this way, the machine learning model can be trained iteratively as data from the system (e.g., conversational data in live log database 351 (FIG. 3) or labeled data in training phrase database 352 (FIG. 3)) is added to the corresponding training dataset. In many embodiments, the machine learning model can be iteratively trained in real time as data is added to the corresponding training dataset.

In many embodiments, the machine learning models for method 400 (e.g., text-to-text ML model 312 (FIG. 3), label-generating ML model 314 (FIG. 3), and/or deep learning entity model 315 (FIG. 3)) further can be trained, at least in part, on domain-specific data in a training dataset. In this way, the machine learning models can be tailored to a single domain. In several embodiments, due to a large amount of data used to create and maintain the training dataset, the machine learning models each can use extensive data inputs to determine paraphrases and/or create label data, etc. Due to these extensive data inputs, in many embodiments, creating, training, and/or using a machine learning model configured to determine paraphrases and/or create label data cannot practically be performed in a mind of a human being.

Various embodiments can include a system for automatically augmenting and labeling conversational data for training machine learning models. The system can include one or more processors and one or more non-transitory computer-readable media storing computing instructions that, when executed on the one or more processors, cause the one or more processors to perform various acts.

In a number of embodiments, the acts can include generating training data for an intent classification machine learning model. The acts further can include transmitting the training data, as generated, to the intent classification machine learning model for training. In certain embodiments, generating the training data can include: (a) determining, via a text-to-text machine learning model, one or more respective paraphrases for each sample phrase of training phrases, and/or generating, via a label generating machine learning model, labeled data based on unlabeled live logs; and (b) adding the one or more respective paraphrases for the each sample phrase of the training phrases and/or the labeled data to the training data. In some embodiments, a respective quantity of the one or more respective paraphrases can vary for the each sample phrase of the training phrases.

In several embodiments, the acts can include generating the labeled data based on the unlabeled live logs by: determining live-log samples from the unlabeled live logs based at least in part on: (a) a respective timestamp of each live log of the unlabeled live logs, or (b) random sampling; and generating, via the label generating machine learning model, the labeled data based on the live-log samples and one or more labeling functions.

Further, various embodiments can include a method being implemented via execution of computing instructions configured to run at one or more processors and stored at one or more non-transitory computer-readable media. The method can comprise generating training data for an intent classification machine learning model and transmitting the training data, as generated, to the intent classification machine learning model for training. The method can include generating the training data for the intent classification machine learning model by: determining, via a text-to-text machine learning model, one or more respective paraphrases for each sample phrase of training phrases. A respective quantity of the one or more respective paraphrases varies for the each sample phrase of the training phrases.

Further, the method can include generating the training data for the intent classification machine learning model by: generating, via a label generating machine learning model, labeled data based on unlabeled live logs by: determining live-log samples from the unlabeled live logs based at least in part on: (a) a respective timestamp of each live log of the unlabeled live logs, or (b) random sampling; and generating, via the label generating machine learning model, the labeled data based on the live-log samples and one or more labeling functions. In addition, the method can include generating the training data for the intent classification machine learning model by: adding the one or more respective paraphrases for the each sample phrase of the training phrases and the labeled data to the training data.

The methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although automatically augmenting and labeling conversational data has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-4 may be modified, and that the foregoing discussion of certain of these embodiments does not necessarily represent a complete description of all possible embodiments. Different approaches, AI models, and/or ML models may be used to augment and/or label conversational data that can be used for training various machine learning models, such as an intent classification machine learning model. System 300 (FIG. 3), system 310 (FIG. 3), and/or method 400 (FIG. 4) further can provide user interfaces to be executed on user devices (e.g., user device 330 (FIG. 3)) to receive labels for the unlabeled live logs from human annotators (e.g., user 331 (FIG. 3)) and/or allow users (e.g., user 331 (FIG. 3)) to supervise the various models used in the systems or methods (e.g., intent classification ML model (FIG. 3), text-to-text ML model 312 (FIG. 3), template-based augmentation model 313 (FIG. 3), label generating ML model 314 (FIG. 3), and/or deep learning entity model 315 (FIG. 3)).

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processors, cause the one or more processors to perform:
generating training data for an intent classification machine learning model by:
determining, via a text-to-text machine learning model, one or more respective paraphrases for each sample phrase of training phrases, wherein:
a respective quantity of the one or more respective paraphrases varies for the each sample phrase of the training phrases;
generating, via a label generating machine learning model, labeled data based on unlabeled live logs by:
determining live-log samples from the unlabeled live logs, comprising:
stratifying the unlabeled live logs into multiple data bins based on a respective timestamp of each of the unlabeled live logs; and
randomly selecting respective unlabeled live logs from each of the multiple data bins to add to the live-log samples;
wherein a respective quantity of the respective unlabeled live logs for the each of the multiple data bins is: (a) a predetermined number; or (b) proportional to a respective size of the each of the multiple data bins; and
generating, via the label generating machine learning model, the labeled data based on the live-log samples and one or more labeling functions; and
adding the one or more respective paraphrases for the each sample phrase of the training phrases and the labeled data to the training data; and
transmitting the training data, as generated, to the intent classification machine learning model for training.

2. The system in claim 1, wherein:
determining the one or more respective paraphrases for the each sample phrase of the training phrases further comprises:

sorting the one or more respective paraphrases for the each sample phrase in descending order based on a respective paraphrase probability of each of the one or more respective paraphrases in a paraphrase probability distribution of the each sample phrase;

determining a minimum quantity of the one or more respective paraphrases, as sorted, so that an accumulative paraphrase probability for the minimum quantity of the one or more respective paraphrases, as sorted, is at least as great as a predetermined probability;

when the minimum quantity is greater than a predetermined maximum paraphrase quantity, setting the minimum quantity as the predetermined maximum paraphrase quantity; and removing each paraphrase in a position of the one or more respective paraphrases, as sorted, greater than the minimum quantity from the one or more respective paraphrases.

3. The system in claim 1, wherein:

determining the one or more respective paraphrases for the each sample phrase of the training phrases further comprises:

determining whether a paraphrase of the one or more respective paraphrases for the each sample phrase is unacceptable; and when the paraphrase, as determined, is unacceptable, removing the paraphrase from the one or more respective paraphrases; and the paraphrase of the one or more respective paraphrases for the each sample phrase is unacceptable when one or more of:

a difference between a sequence length of the paraphrase and a sequence length of the each sample phrase is greater than a predetermined sequence length threshold;

a linguistic acceptability score of the paraphrase is less than a predetermined linguistic threshold; or a semantic similarity score between the paraphrase and the each sample phrase is less than a predetermined similarity threshold.

4. The system in claim 1, wherein:

prior to determining the one or more respective paraphrases for the each sample phrase of the training phrases, the text-to-text machine learning model is pre-trained based on a first dataset with unlabeled data and fine-tuned based on a second dataset with paraphrase pairing data.

5. The system in claim 1, wherein:

determining the one or more respective paraphrases for the each sample phrase of the training phrases further comprises, prior to determining the one or more respective paraphrases for the each sample phrase:

when the each sample phrase comprises one or more domain-specific acronyms, abstracting out the one or more domain-specific acronyms in the each sample phrase.

6. The system in claim 1, wherein:

the one or more labeling functions for generating the labeled data comprises one or more of:

retrieving one or more respective labels for each of the live-log samples from an existing table based on: (a) one or more entities, or (b) one or more regular expressions, in the each of the live-log samples;

determining the one or more respective labels for each of the live-log samples based on a respective distance between a respective embedding of each of the one or more respective labels and each phrase of one or more phrases in the each of the live-log samples; or determining, via a deep learning entity model, the one or more respective labels for each of the live-log samples based on one or more entities in the each of the live-log samples.

7. The system in claim 1, wherein:

generating the labeled data based on the unlabeled live logs further comprises:

determining a distance between a labeled phrase of the labeled data and an intent embedding for a label tagged by the label generating machine learning model for the labeled phrase; and when the distance is greater than a predetermined label distance threshold, removing the labeled phrase from the labeled data.

8. The system in claim 1, wherein:

generating the training data for the intent classification machine learning model further comprises generating one or more new phrases based on an input phrase and one or more entity maps; and the computing instructions, when executed on the one or more processors, further cause the one or more processors to perform: adding the one or more new phrases to the training data.

9. The system in claim 8, wherein:

generating the one or more new phrases further comprises:

mapping the input phrase with a corresponding entity map of the one or more entity maps to identify one or more entities in the input phrase; and replacing the one or more entities in the input phrase by one or more sets of one or more first entities of preexisting entities to generate the one or more new phrases.

10. A method being implemented via execution of computing instructions configured to run at one or more processors and stored at one or more non-transitory computer-readable media, the method comprising:

generating training data for an intent classification machine learning model by:

determining, via a text-to-text machine learning model, one or more respective paraphrases for each sample phrase of training phrases, wherein:

a respective quantity of the one or more respective paraphrases varies for the each sample phrase of the training phrases;

generating, via a label generating machine learning model, labeled data based on unlabeled live logs by:

determining live-log samples from the unlabeled live logs, comprising:

stratifying the unlabeled live logs into multiple data bins based on a respective timestamp of each of the unlabeled live logs; and randomly selecting respective unlabeled live logs from each of the multiple data bins to add to the live-log samples;

wherein a respective quantity of the respective unlabeled live logs for the each of the multiple data bins is: (a) a predetermined number; or (b) proportional to a respective size of the each of the multiple data bins; and generating, via the label generating machine learning model, the labeled data based on the live-log samples and one or more labeling functions; and adding the one or more respective paraphrases for the each sample phrase of the training phrases and the labeled data to the training data; and transmitting the training data, as generated, to the intent classification machine learning model for training.

11. The method in claim 10, wherein:

determining the one or more respective paraphrases for the each sample phrase of the training phrases further comprises:
   sorting the one or more respective paraphrases for the each sample phrase in descending order based on a respective paraphrase probability of each of the one or more respective paraphrases in a paraphrase probability distribution of the each sample phrase;
   determining a minimum quantity of the one or more respective paraphrases, as sorted, so that an accumulative paraphrase probability for the minimum quantity of the one or more respective paraphrases, as sorted, is at least as great as a predetermined probability;
   when the minimum quantity is greater than a predetermined maximum paraphrase quantity, setting the minimum quantity as the predetermined maximum paraphrase quantity; and
   removing each paraphrase in a position of the one or more respective paraphrases, as sorted, greater than the minimum quantity from the one or more respective paraphrases.

12. The method in claim 10, wherein:

determining the one or more respective paraphrases for the each sample phrase of the training phrases further comprises:
   determining whether a paraphrase of the one or more respective paraphrases for the each sample phrase is unacceptable; and
   when the paraphrase, as determined, is unacceptable, removing the paraphrase from the one or more respective paraphrases; and
the paraphrase of the one or more respective paraphrases for the each sample phrase is unacceptable when one or more of:
   a difference between a sequence length of the paraphrase and a sequence length of the each sample phrase is greater than a predetermined sequence length threshold;
   a linguistic acceptability score of the paraphrase is less than a predetermined linguistic threshold; or
   a semantic similarity score between the paraphrase and the each sample phrase is less than a predetermined similarity threshold.

13. The method in claim 10, wherein:

prior to determining the one or more respective paraphrases for the each sample phrase of the training phrases, the text-to-text machine learning model is pre-trained based on a first dataset with unlabeled data and fine-tuned based on a second dataset with paraphrase pairing data.

14. The method in claim 10, wherein:

determining the one or more respective paraphrases for the each sample phrase of the training phrases further comprises, prior to determining the one or more respective paraphrases for the each sample phrase:
   when the each sample phrase comprises one or more domain-specific acronyms, abstracting out the one or more domain-specific acronyms in the each sample phrase.

15. The method in claim 10, wherein:

the one or more labeling functions for generating the labeled data comprises one or more of:
   retrieving one or more respective labels for each of the live-log samples from an existing table based on: (a) one or more entities, or (b) one or more regular expressions, in the each of the live-log samples;
   determining the one or more respective labels for each of the live-log samples based on a respective distance between a respective embedding of each of the one or more respective labels and each phrase of one or more phrases in the each of the live-log samples; or
   determining, via a deep learning entity model, the one or more respective labels for each of the live-log samples based on one or more entities in the each of the live-log samples.

16. The method in claim 10, wherein:

generating the labeled data based on the unlabeled live logs further comprises:
   determining a distance between a labeled phrase of the labeled data and an intent embedding for a label tagged by the label generating machine learning model for the labeled phrase; and
   when the distance is greater than a predetermined label distance threshold, removing the labeled phrase from the labeled data.

17. The method in claim 10, wherein:

generating the training data for the intent classification machine learning model further comprises generating one or more new phrases based on an input phrase and one or more entity maps;

generating the one or more new phrases further comprises:
   mapping the input phrase with a corresponding entity map of the one or more entity maps to identify one or more entities in the input phrase; and
   replacing the one or more entities in the input phrase by one or more sets of one or more first entities of preexisting entities to generate the one or more new phrases; and
the method further comprises adding the one or more new phrases to the training data.

18. A non-transitory computer-readable media storing computing instructions that, when executed by one or more processors, cause the one or more processors to perform operations comprising:

generating training data for an intent classification machine learning model by:
   determining, via a text-to-text machine learning model, one or more respective paraphrases for each sample phrase of training phrases, wherein:
      a respective quantity of the one or more respective paraphrases varies for the each sample phrase of the training phrases;
   generating, via a label generating machine learning model, labeled data based on unlabeled live logs by:
      determining live-log samples from the unlabeled live logs, comprising:
         stratifying the unlabeled live logs into multiple data bins based on a respective timestamp of each of the unlabeled live logs; and
         randomly selecting respective unlabeled live logs from each of the multiple data bins to add to the live-log samples;
      wherein a respective quantity of the respective unlabeled live logs for the each of the multiple data bins is: (a) a predetermined number; or (b) proportional to a respective size of the each of the multiple data bins; and generating, via the label generating machine learning model, the labeled data based on the live-log samples and one or more labeling functions; and adding the one or more respective paraphrases for the each sample phrase of the training phrases and the labeled data to the training data; and transmitting the training data, as generated, to the intent classification machine learning model for training.

19. The non-transitory computer-readable media in claim 18, wherein:

determining the one or more respective paraphrases for the each sample phrase of the training phrases further comprises:

sorting the one or more respective paraphrases for the each sample phrase in descending order based on a respective paraphrase probability of each of the one or more respective paraphrases in a paraphrase probability distribution of the each sample phrase;

determining a minimum quantity of the one or more respective paraphrases, as sorted, so that an accumulative paraphrase probability for the minimum quantity of the one or more respective paraphrases, as sorted, is at least as great as a predetermined probability;

when the minimum quantity is greater than a predetermined maximum paraphrase quantity, setting the minimum quantity as the predetermined maximum paraphrase quantity; and removing each paraphrase in a position of the one or more respective paraphrases, as sorted, greater than the minimum quantity from the one or more respective paraphrases.

20. The non-transitory computer-readable media in claim 18, wherein:

determining the one or more respective paraphrases for the each sample phrase of the training phrases further comprises:

determining whether a paraphrase of the one or more respective paraphrases for the each sample phrase is unacceptable; and when the paraphrase, as determined, is unacceptable, removing the paraphrase from the one or more respective paraphrases; and the paraphrase of the one or more respective paraphrases for the each sample phrase is unacceptable when one or more of:

a difference between a sequence length of the paraphrase and a sequence length of the each sample phrase is greater than a predetermined sequence length threshold;

a linguistic acceptability score of the paraphrase is less than a predetermined linguistic threshold; or a semantic similarity score between the paraphrase and the each sample phrase is less than a predetermined similarity threshold.

\* \* \* \* \*